(12) United States Patent
Marquar et al.

(10) Patent No.: US 8,910,759 B2
(45) Date of Patent: Dec. 16, 2014

(54) VIBRATION DAMPER

(75) Inventors: Hendrik Marquar, Schweinfurt (DE);
Manfred Schuler, Dittelbrunn (DE);
Josef Renn, Dettelbach (DE); Klaus Stretz, Hassfurt (DE); Karin Sundermann, Sennfeld (DE); Michael Zutzmann, Schweinfurt (DE); Werner Hufenbach, Dresden (DE); Martin Lepper, Dresden (DE); Jens Werner, Coswig (DE); Enrico Ladusch, Dresden (DE); Stefan Effmert, Pirna (DE)

(73) Assignees: ZF Friedrichshafen AG, Friedrichshafen (DE);
Leichtbau-Zentrum Sachsen GmbH, Desden (DE)

( * ) Notice: Subject to any disclaimer, the term of this patent is extended or adjusted under 35 U.S.C. 154(b) by 548 days.

(21) Appl. No.: 12/878,455

(22) Filed: Sep. 9, 2010

(65) Prior Publication Data

US 2011/0056785 A1 Mar. 10, 2011

(30) Foreign Application Priority Data

Sep. 9, 2009 (DE) .................. 10 2009 029 299

(51) Int. Cl.
*F16F 9/00* (2006.01)
*F16F 9/54* (2006.01)
*B60G 15/07* (2006.01)
*F16F 9/32* (2006.01)
*F16F 7/00* (2006.01)

(52) U.S. Cl.
CPC . *F16F 9/54* (2013.01); *B60G 15/07* (2013.01); *F16F 9/3242* (2013.01); *B60G 2200/142* (2013.01); *B60G 2200/17* (2013.01); *B60G 2202/31* (2013.01); *B60G 2204/129* (2013.01); *B60G 2204/4304* (2013.01); *B60G 2206/013* (2013.01); *B60G 2206/014* (2013.01); *B60G 2206/41* (2013.01); *B60G 2206/50* (2013.01); *B60G 2206/7101* (2013.01); *B60G 2206/8101* (2013.01); *B60G 2206/91* (2013.01)
USPC ................... 188/322.19; 188/251 A; 267/136

(58) Field of Classification Search
USPC ............... 188/322.19, 322.12, 251 A, 106 R; 267/136, 141
See application file for complete search history.

(56) References Cited

U.S. PATENT DOCUMENTS

| 4,440,429 | A | * | 4/1984 | Eyb ............................ 293/120 |
| 4,854,175 | A | * | 8/1989 | Budhu ........................... 73/841 |
| 5,620,172 | A | * | 4/1997 | Fulks et al. ................... 267/221 |
| 6,359,236 | B1 | * | 3/2002 | DiStefano et al. ............ 174/261 |
| 2002/0046623 | A1 | * | 4/2002 | Carlson et al. ................. 74/574 |
| 2008/0111288 | A1 | * | 5/2008 | Howard et al. ............ 267/64.27 |

FOREIGN PATENT DOCUMENTS

| DE | 1 923 239 | 9/1965 |
| DE | 29 34 671 | 3/1981 |
| DE | 33 01 774 | 7/1984 |

(Continued)

*Primary Examiner* — Melody Burch
(74) *Attorney, Agent, or Firm* — Cozen O'Connor

(57) ABSTRACT

A vibration damper including a cylinder with a cylinder-side connection member. The at least one mounted component is fastened to the cylinder by a material bond. The cylinder and the mounted component are made of plastic. The mounted component and/or the cylinder are based on at least one ready-prepared semi-finished product that forms the surface of the vibration damper on at least one body side in the final state. Plastic supplemental volume fractions determine the finished body contour.

19 Claims, 6 Drawing Sheets

(56) References Cited

FOREIGN PATENT DOCUMENTS

| | | |
|---|---|---|
| DE | 41 07 375 | 12/1991 |
| DE | 92 07 582 | 10/1992 |
| DE | 42 32 136 | 3/1994 |
| DE | 937 273 | 12/1995 |
| DE | 44 30 502 | 2/1996 |
| DE | 103 20 002 | 11/2004 |
| DE | 10 2006 062 414 | 6/2008 |
| DE | 10 2007 053 120 | 5/2009 |
| EP | 0 027 163 | 4/1981 |
| JP | 03-288 032 | 12/1991 |

\* cited by examiner

Fig. 1
Fig. 2
Fig. 3
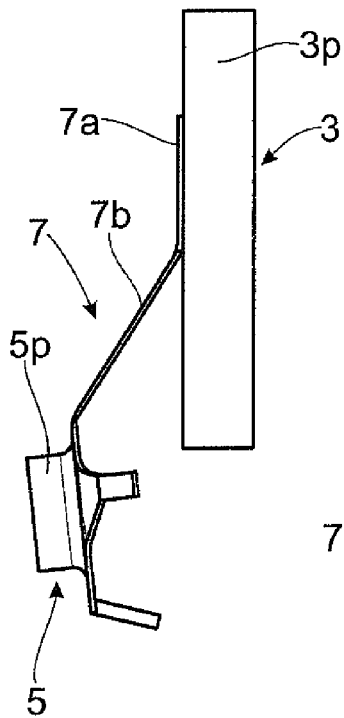
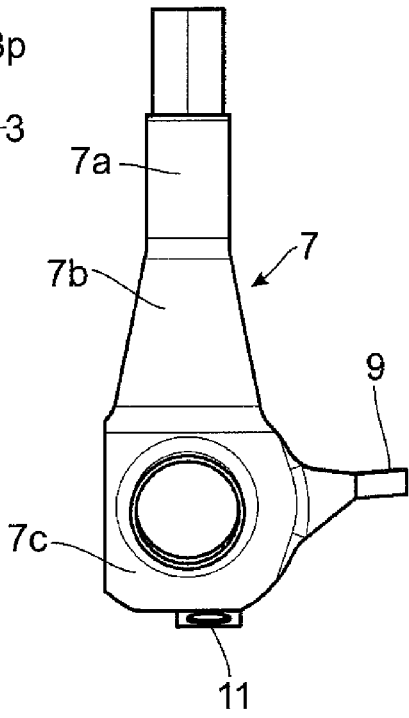
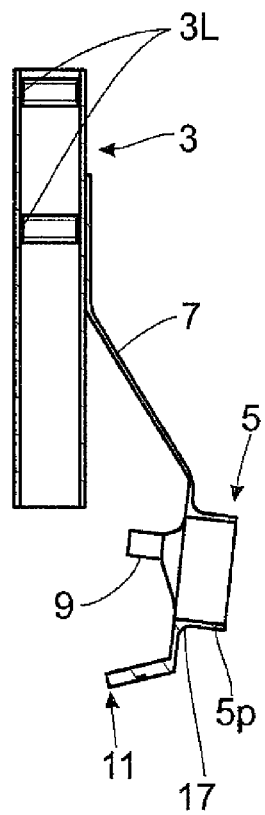
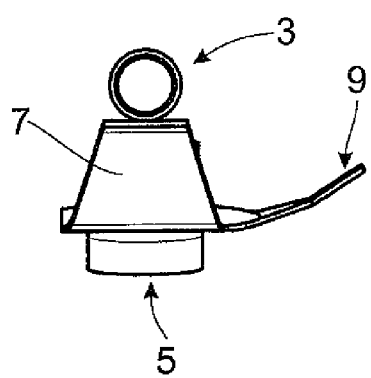
Fig. 4

Fig. 7
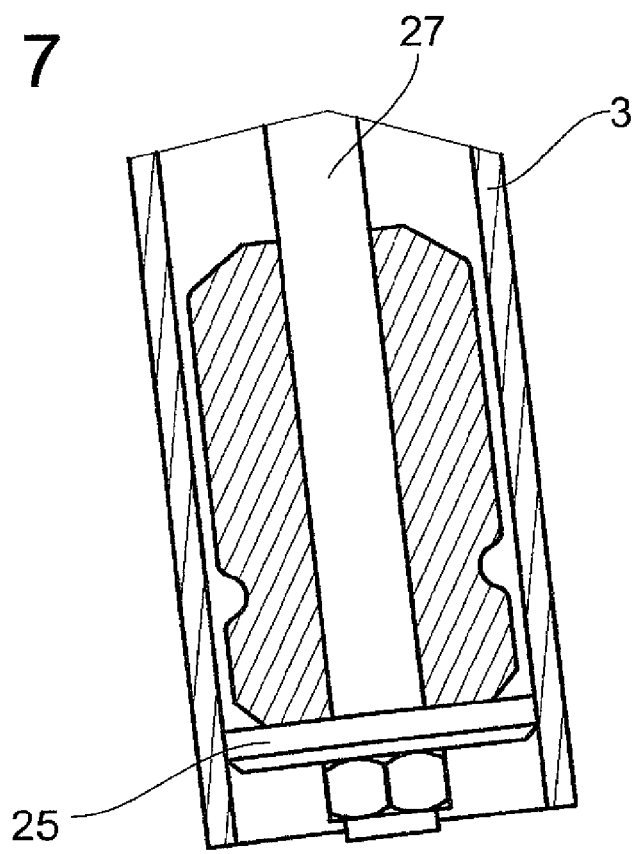
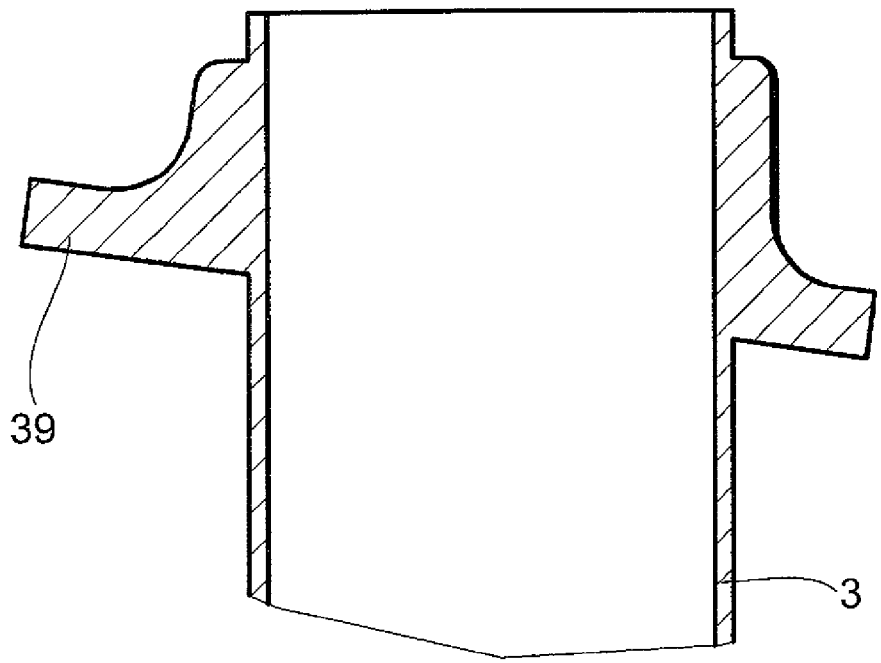
Fig. 13

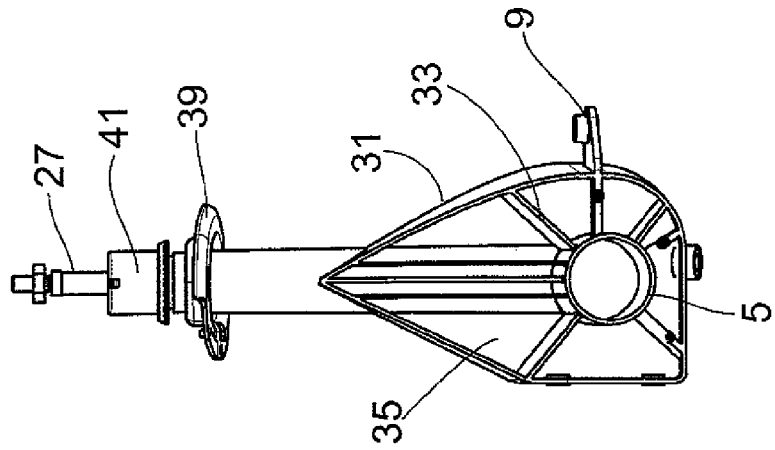
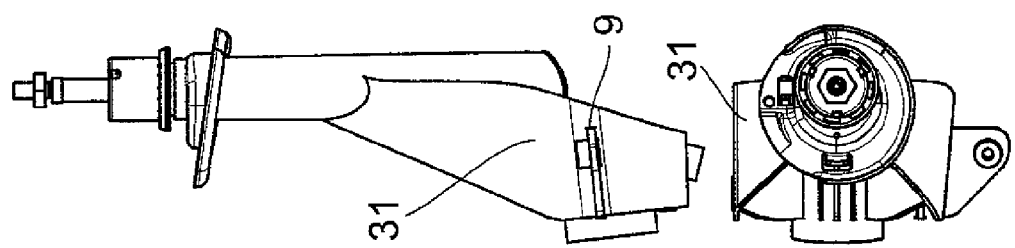
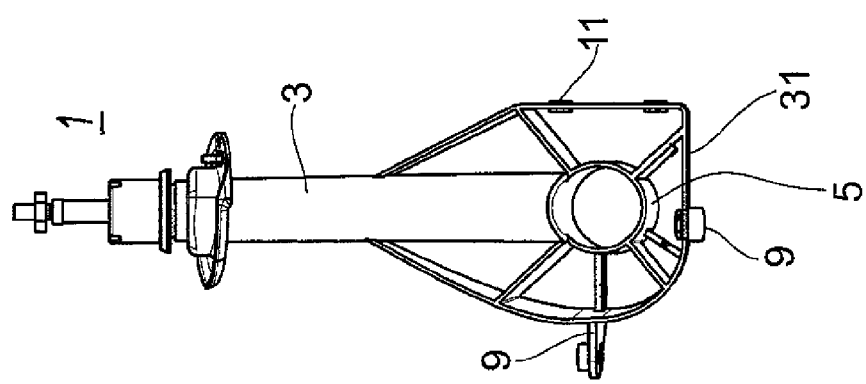

VIBRATION DAMPER

BACKGROUND OF THE INVENTION

1. Field of the Invention

The invention is directed to a vibration damper for a motor vehicle chassis.

2. Description of the Related Art

A suspension strut produced by a casting method is known from DE 42 32 136 A1. The materials mentioned for the casting process are exclusively metal materials. A suspension strut serving as a supporting structural component part in a motor vehicle chassis is subject to high loads so that correspondingly demanding requirements are imposed on the materials as regards strength values. However, a suspension strut of this kind is comparatively heavy. Therefore, DE 42 32 136 A1 mentions aluminum as a possible lightweight construction material. However, aluminum is a relatively expensive material and, especially for this reason, has not been widely used in vibration dampers for vehicles in the compact class.

EP 0 027 163 A1 suggests fabricating an outer jacket tube of a vibration damper from plastic. An inner work cylinder is made of metal material. The inner work cylinder is under the operating pressure inside the work spaces by reason of its function. In comparison, the loading of the outer jacket tube is appreciably less because, on one hand, the connection member on the jacket tube side is connected to the bottom valve and work cylinder by a metal connection pin and, on the other hand, the level of pressure, if any, occurring in the compensation space is appreciably lower than in a work space of the inner work cylinder.

It is known from DE 103 20 002 A1 to produce a piston rod for a vibration damper from plastic.

It is known from DE 10 2007 053 120 A1 to produce a steering knuckle for a motor vehicle chassis from a fiber-reinforced composite material. The steering knuckle has a shell-shaped basic structure and is connected to a suspension strut by a clip-like closure. The steering knuckle is formed by a woven or non-woven material that must be given the predetermined shape of the steering knuckle. This skeleton structure is inserted into a mold and coated with a filler. The cast part is given its final shape by mechanical reworking. For this reason, complex structural component parts such as steering knuckles necessarily also have a correspondingly complicated fiber reinforcement.

SUMMARY OF THE INVENTION

It is an object of the present invention to reduce the mass of a vibration damper, particularly a suspension strut.

According to one embodiment of the invention, the cylinder and the mounted component are made of plastic, the mounted component and/or the cylinder being based on at least one ready-prepared semi-finished product that forms the surface of the vibration damper on at least one body side in the final state, and plastic supplemental volume fractions determine the finished body contour.

An advantage is that production work cycles can be appreciably reduced through the use of the ready-prepared semi-finished products compared to a conventional production known from the prior art. Because of good surface quality of the semi-finished products, only minor reworking, if any, is required and this can be restricted to the functionally relevant areas. Further, quality-defining tolerances of structural component parts such as geometric accuracy can be appreciably improved.

In one embodiment, the semi-finished product has a reinforcement and a filler material that envelops this reinforcement, and the filler material and the plastic supplemental volume are formed by an identical material. This results in a visually homogeneous structural component part without color deviations or seams.

The reinforcement can extend beyond the side edges. The reinforcement in the semi-finished products is long-fibered and directionally defined. The plastic supplemental volume fractions likewise present a reinforcement, but one which comprises short fibers. The reinforcement portions protruding from the semi-finished products are enclosed by the plastic supplemental volume fractions and lastingly enhance the strength of the entire structural component part.

The reinforcement can be part of a sensor arrangement. The reinforcement can be made electrically conductive in an economical manner and accordingly assumes the function of a strain gauge in practice.

Optionally, the semi-finished product can have a connection profile for integration in the vibration damper. This enlarges the connection surfaces so that more plastic supplemental volume fractions can be introduced.

A plurality of mounted components can be joined together by a connection web to increase strength.

The connection web is fitted to the cylinder by both ends in the manner of a belt and accordingly forms a closed strut profile.

For optimized transmission of force, i.e., with compressive loading, the connection web is connected to the cylinder at an acute angle.

To achieve the largest possible contact surface, the connection web has a connection area which is adapted to the curved surface of the cylinder.

To meet the different loads in an optimal manner, the connection web varies in width considered along the circumference. In this way, the use of material and, therefore, the mass of the vibration damper can be further minimized.

The cylinder-side connection member is arranged radially inside the connection web and is supported at the latter.

To further reinforce the connection web, compression spokes are arranged radially inside the connection web.

The compression spokes are fitted to the cylinder-side connection member. The connection web, the compression spokes and the cylinder-side connection member form a kind of wheel profile.

To meet the load-specific conditions, a plurality of compression spokes are constructed parallel to the longitudinal axis of the vibration damper starting from the cylinder-side connection member. A plurality of thinner compression spokes results in an elasticity in one direction but ensures a high dimensional stability in another direction.

The compression spokes can be standardized, but in a preferred construction vary in width and/or material thickness in order to achieve the lowest possible weight.

To further stiffen the vibration damper, the compression spokes and the belt-shaped connection web can form a box profile by a connecting base.

Connection elements formed of a material different than the filler material are arranged in the mounted components or connection web. For example, the connection elements can be constructed as metal threaded bushings.

It is possible for the cylinder to have a base at which a connection is made for a piston rod of the vibration damper. The vibration damper is then conceived as a cartridge which can be mounted in the cylinder so as to be exchangeable.

In one embodiment, the cylinder has an axial sliding bearing at its inner side for an outer cylinder of the vibration damper. The plastic surface of the cylinder provides for a low-friction relative movement between the outer cylinder and the cylinder.

In the method according to one embodiment of the invention, the cylinder and the ready-prepared semi-finished products are inserted in a device. Gaps between the semi-finished products and/or the cylinder are filled by plastic supplemental volume fractions. The great advantage resides in the shorter work cycle, but also in the simpler construction of the device. For example, the quantity of compression spokes employed can simply be carried out, or the connection elements can already be inserted in the semi-finished products.

The plastic supplemental volume is introduced into the device in granular form and is subsequently heated. The usual rules of construction, e.g., preventing accumulations of material in the transition between two walls, need no longer be followed.

The fiber direction is important for optimal strength of the vibration damper. Therefore, an intermediate semi-finished product with an orientation of fiber material is produced in an antecedent method step. The intermediate semi-finished product can be a plate, a pipe or an angle profile.

The semi-finished products are shaped from the intermediate semi-finished product. The fiber orientation can be configured individually by a specific angular positioning between the reinforcement and, e.g., the side edges of the semi-finished product.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The invention will be described more fully with reference to the following description of the drawings.

In the drawings:

FIG. 1-4 are views of a vibration damper with steering knuckle;

FIG. 7 is a detail of cylinder with base;

FIGS. 8-11 are views of the vibration damper with connection web;

FIG. 13 is a cylinder with spring plate in section.

DETAILED DESCRIPTION OF THE DRAWINGS

Figure 5:
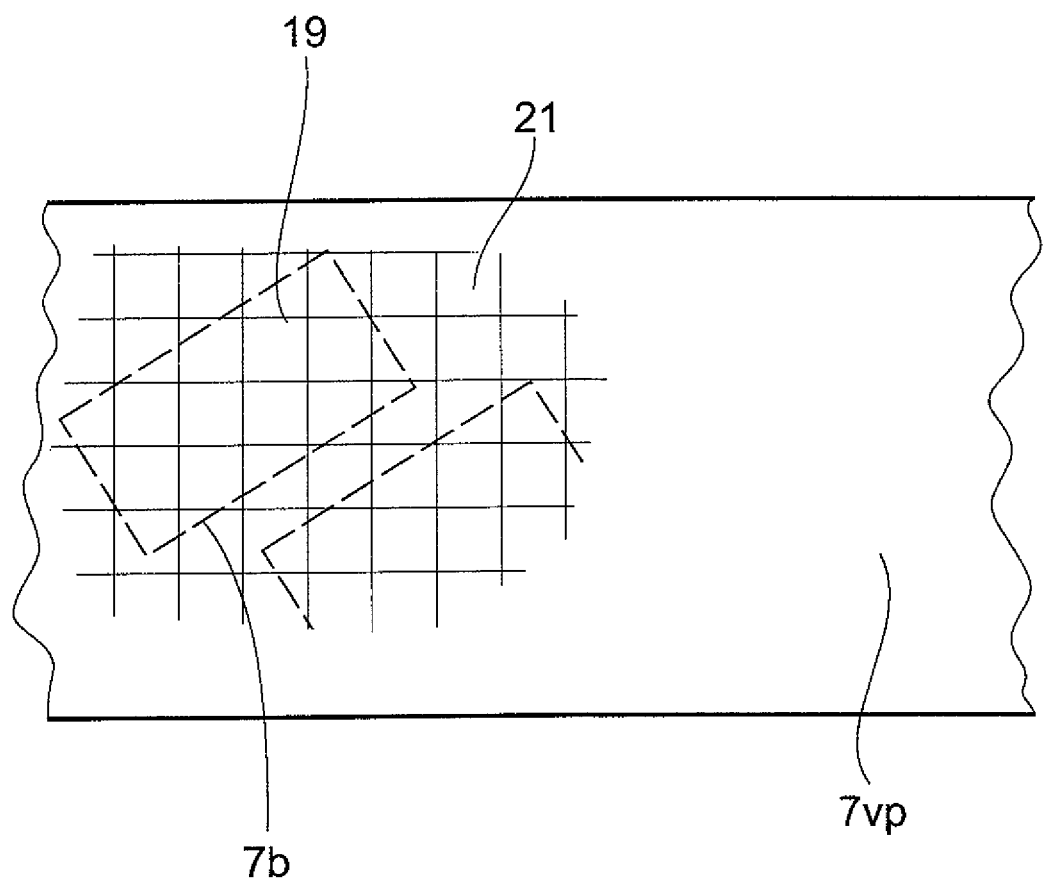
FIG. 5 is an example of a semi-finished product.

A vibration damper 1 with a cylinder 3 at which a cylinder-side connection member 5 is formed is described in a simplified manner with reference to FIGS. 1 to 4. Further, the cylinder 3 has at least one mounted component which is fastened to the cylinder by a material bond. The cylinder 3 and the mounted component 7 are made of plastic. In one embodiment, a steering knuckle 7 forms a first mounted component and additional mounted components 9 and 11 are formed at the steering knuckle. The mounted components 7, 9, and 11 are based on ready-prepared semi-finished products. These semi-finished products form the surface of the vibration damper on at least one body side in the final state. In this embodiment example, the semi-finished products are, e.g., plate elements 7a, 7b, and 7c, but also at least one pipe element 3p for the cylinder 3 and another pipe element 5p for the cylinder-side connection member 5. The contact areas between the ready-prepared semi-finished products or transitions i.e., 17, to the cylinder are formed by plastic supplemental volume fractions which determine the finished body contour.

Figure 6:
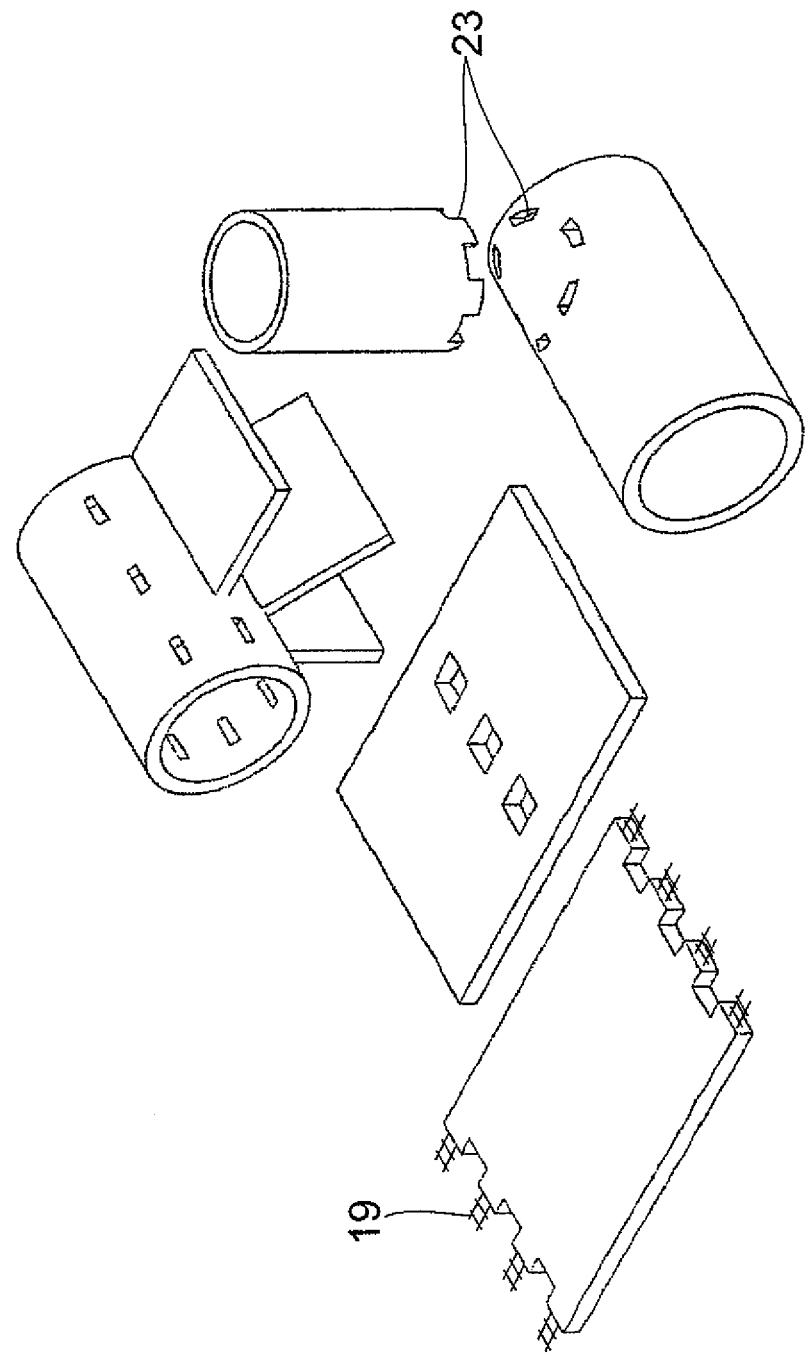
FIG. 6 is a semi-finished product with connection profile.

Every semi-finished product, e.g., 7b in FIG. 5, has a woven fabric-like reinforcement which is enveloped by a filler material 21. The filler material and the plastic supplemental volume between the semi-finished products are formed of an identical material so that a uniform surface and visual appearance of all of the mounted components, including the cylinder, can be achieved. The reinforcement 19 in the semi-finished products can extend beyond the side edges (FIG. 6) so that the filler material of the plastic supplemental volume envelops and surrounds this reinforcement.

Further, it is possible for the semi-finished products to have connection profiles 23 for integration in the vibration damper. These connection profiles can be, e.g., finger-like continuations which engage in the adjacent semi-finished product. Any gaps or voids are closed or filled up by the plastic supplemental volume.

The production method for a vibration damper according to the invention with at least one mounted component is designed in the following manner: In a first method step, an intermediate semi-finished product 7vp with an orientation of the reinforcement is produced as is shown in FIG. 5. A plate, a pipe or an angle profile, for example, can be considered as an intermediate semi-finished product. An intermediate semi-finished product has a very simple geometry so that the fiber orientation, e.g., with reference to an edge or surface, can be implemented easily. Fibers oriented in this way can also be part of a sensor arrangement, not shown, e.g., based on the principle of a strain gauge, in order to measure wheel contact forces, for example. In a subsequent method step, a semi-finished product is shaped from the intermediate semi-finished product. This relationship is illustrated by the contour of the semi-finished product shown in dashed lines. The orientation of the fiber material can be determined in a very simple and precise manner simply by rotating the intermediate semi-finished product relative to the semi-finished product. A semi-finished product can be worked out of an intermediate semi-finished product, e.g., by a laser, punch, or saw. The semi-finished products produced in this way are used in a device, not shown. The plastic supplemental volume is introduced in granular form into the gaps or free spaces that still remain open and is then heated. In this way, all of the ready-prepared semi-finished products are joined to form an indissoluble, whole structural component part.

The cylinder 3 according to FIGS. 1 to 3 receives the vibration damper as a cartridge. Solutions of this kind are known, for example, from DE 29 34 671 A1 or DE 33 01 774 A1. For this purpose, the cylinder 3 according to FIG. 7 can be constructed with a base 25 having a connection for a piston rod 27 or having an outer cylinder of the vibration damper. Further, it can be seen from FIG. 3 that the cylinder 3 has at least one sliding bearing 3L on the inner side for the outer cylinder of the vibration damper, namely, when the piston rod 27 of the vibration damper is fixedly connected to the cylinder 3.

FIGS. 8 to 11 show an embodiment form of a vibration damper 1 in which a plurality of mounted components 5, 9 are joined by a connection web 31. The connection web 31 is fitted to the cylinder 3 by its two ends in a belt-shaped manner.

The ends of the connection web 31 terminate in an acute angle at the cylinder 3 and are adapted to the curved surface of the cylinder 3. It can be seen from FIG. 9 that the connection web varies in width considered along a circumference. The cylinder-side connection member 5 is arranged radially inside the connection web 31. Further, radially extending compression spokes 33 are arranged inside the connection web 31. These compression spokes 33 are fitted to the cylinder-side connection member 5 and terminate at the connection web 31 with their outwardly facing ends. The compression spokes 33 can have different widths depending on load. It is also possible and useful when a plurality of compression spokes 33 constructed parallel to the longitudinal axis of the vibration damper (FIG. 10) starting from the cylinder-side connection member. The compression spokes 33 and the belt-shaped connection web 31 can possibly form a closed box profile by a connecting base 35.

Figure 12:
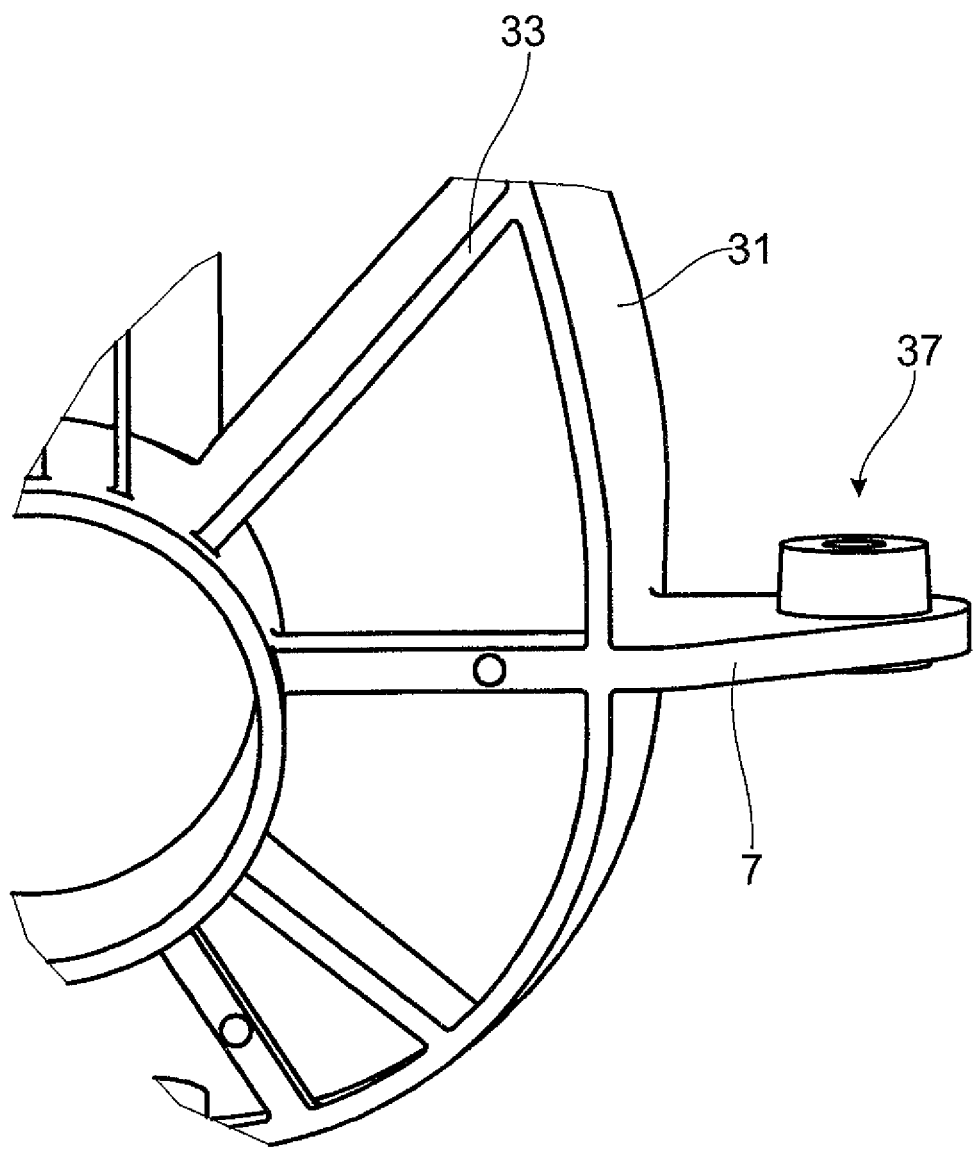
FIG. 12 is a section from connection web according to FIG. 10.

FIG. 12 shows that connector 37 formed from a material other than that of the filler material 21, e.g., metal threaded sleeves, are arranged in the mounted component 7 or in the connection web 31. This variant would also be produced according to the above-described method in which, e.g., the compression spokes 33 and the connecting belt 31 and cylinder 3 are inserted into a device as prefabricated semi-finished products. In addition to the view shown in FIGS. 1-4, it can be seen from FIGS. 8-11 that a spring plate 39 is fixed to the cylinder 3 (FIG. 13). This spring plate 39 can also be a semi-finished product or can be completely shaped from filler material and connected to the cylinder in the device.

In the construction according to FIG. 7, the cartridge of the vibration damper 1 is held axially and radially in the cylinder 3 on the one hand, and a cap 41 is used to secure it. This cap engages at the cartridge of the vibration damper at the front and is connected to the cylinder 3 in a known manner so that there is provided a closed outer container from which, e.g., the piston rod 27 of the vibration damper 1 protrudes.

In conclusion, an appreciable advantage with respect to mass can be achieved by the construction shown herein compared to a metal cylinder with mounted components.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

We claim:

1. A vibration damper comprising:
   a cylinder made of plastic having a cylinder-side connection member;
   at least one mounted component of a plurality of mounted components made of plastic fastened to the cylinder by a material bond;
   plastic supplemental volume fractions that determine at least a surface of a finished body contour;
   a connection web, wherein the plurality of mounted components are joined together by the connection web;
   the cylinder-side connection member arranged radially inside the connection web;
   a plurality of individual compression spokes arranged radially inside the connection web between the connection web and the cylinder-side connection member,
   wherein at least one of the at least one mounted component and the cylinder are based on at least one ready-prepared semi-finished product that forms the surface of the vibration damper in a final state,
   wherein the connection web is fitted to the cylinder by its respective ends in a belt manner.

2. The vibration damper according to claim 1, wherein the ready-prepared semi-finished product comprises:
   a reinforcement; and
   a filler material that envelops the reinforcement, the filler material and the plastic supplemental volume are a substantially identical material.

3. The vibration damper according to claim 2, wherein the reinforcement extends beyond side edges of the ready-prepared semi-finished product.

4. The vibration damper according to claim 2, wherein the reinforcement is part of a sensor arrangement.

5. The vibration damper according to claim 1, wherein the semi-finished product comprises a connection profile for integration in the vibration damper.

6. The vibration damper according to claim 1, wherein the connection web is connected to the cylinder at an acute angle.

7. The vibration damper according to claim 1, wherein the connection web comprises a connection area configured to the curved surface of the cylinder.

8. The vibration damper according to claim 1, wherein the connection web varies in width considered along a circumference of the cylinder.

9. The vibration damper according to claim 1, wherein the compression spokes are fitted to the cylinder-side connection member.

10. The vibration damper according to claim 9, wherein the plurality of compression spokes are constructed parallel to a longitudinal axis of the vibration damper starting from the cylinder-side connection member.

11. The vibration damper according to claim 1, wherein the compression spokes vary in width.

12. The vibration damper according to claim 1, wherein the compression spokes and the belt-shaped connection web form a box profile by a connecting base.

13. The vibration damper according to claim 2, further comprising
   at least one additional connection element formed of a material different than the filler material arranged in the at least one of the at least one mounted component and the connection web.

14. The vibration damper according to claim 1, wherein the cylinder comprises a base having a connection for a piston rod of the vibration damper.

15. The vibration damper according to claim 1, wherein the cylinder has an axial sliding bearing at its inner side for an outer cylinder of the vibration damper.

16. A method for the production of a vibration damper comprising:
   a cylinder made of plastic having a cylinder-side connection member;
   at least one mounted component made of plastic fastened to the cylinder by a material bond; and
   plastic supplemental volume fractions that determine a finished body contour, a connection web, wherein a plurality of the at least one mounted components are joined together by the connection web, the cylinder-side connection member arranged radially inside the connection web, a plurality of individual compression spokes arranged radially inside the connection web between the connection web and the cylinder-side connection member, wherein at least one of the at least one mounted component and the cylinder are based on at least one ready-prepared semi-finished product that forms a surface of the vibration damper in a final state, and wherein the at least one ready-prepared semi-finished product includes a plurality of semi-finished products, the method comprising:

inserting the cylinder and the at least one ready-prepared semi-finished product in a device; and filling gaps between any of the semi-finished products and the cylinder by plastic supplemental volume fractions.

17. The method according to claim 16, further comprising introducing the plastic supplemental volume in granular form; and subsequently heating the plastic supplemental volume.

18. The method according to claim 16, further comprising producing an intermediate semi-finished product with an orientation of fiber material.

19. The method according to claim 18, wherein the semi-finished products are shaped from the intermediate semi-finished product.

* * * * *